United States Patent [19]
Piatt et al.

[11] Patent Number: 4,709,246
[45] Date of Patent: Nov. 24, 1987

[54] ADJUSTABLE PRINT/CARTRIDGE INK JET PRINTER

[75] Inventors: Michael J. Piatt, Enon; Kevin L. Houser, Kettering, both of Ohio

[73] Assignee: Eastman Kodak Company, Rochester, N.Y.

[21] Appl. No.: 945,121

[22] Filed: Dec. 22, 1986

[51] Int. Cl.$^{4}$ .............................................. G01D 15/16
[52] U.S. Cl. ................................ 346/140 R; 400/126; 400/175
[58] Field of Search ........................... 346/140, 139 C; 400/126, 121, 175

[56] References Cited

U.S. PATENT DOCUMENTS

| | | | |
|---|---|---|---|
| 4,364,067 | 12/1982 | Koto | 346/140 R |
| 4,500,895 | 2/1985 | Buck | 346/140 R |
| 4,544,931 | 10/1985 | Watanabe et al. | 346/140 R |
| 4,571,599 | 2/1986 | Rezanka | 346/140 R |
| 4,628,334 | 12/1986 | Dagna | 346/140 R |

*Primary Examiner*—Joseph W. Hartary
*Attorney, Agent, or Firm*—John D. Husser

[57] ABSTRACT

A system for printing with a plurality of removable print/cartridges includes a carriage constructed to traverse a linear print zone and removably support such print/cartridges. A plurality of referencing surfaces are located respectively on each of the carriages, parallel to the direction of the carriages traverse. The carriage includes fastening mechanisms for moving supported print/cartridges into a precise detent relation with respective referencing surfaces of the carriages. The referencing surface portions of the system are adjustable to allow selective physical indexing of print/cartridges, either in registered or interlaced printing positions. A transverse location detection system detects and stores the relative transverse locations of the print/cartridges in either position so that print control electronics can coordinate the output of the print/cartridges transversely.

16 Claims, 23 Drawing Figures

RIGHT TO LEFT TRAVERSE

ADJUSTABLE PRINT/CARTRIDGE INK JET PRINTER

BACKGROUND OF THE INVENTION

1. Field of the Invention

The present invention relates to ink jet printing apparatus of the type using insertable print/cartridges and more particularly to adjustable print/cartridge interface constructions for providing alternative printing capabilities in such apparatus.

2. Description of Background Art

There are known drop-on-demand ink jet printer systems in which a print head carriage bearing a print head traverses across the width of a print medium in line printing operation. Between line printing sequences, the print medium is advanced to prepare for the next sequence. One useful approach for such printing systems is to construct the print head element as part of a disposable print/cartridge which contains an ink supply, drop-generating structures and electrical connections adapted for coupling to the printer, which provides drop-generating energy to such an inserted print/cartridge.

Commonly assigned and concurrently filed U.S. patent application Ser. No. 945,136, entitled "Ink Jet Printer for Cooperatively Printing with a Plurality of Insertable Print/Cartridges", by M. Piatt describes a highly useful approach for ink jet printing with a plurality of insertable print/cartridges. In general, that approach employs the physical positioning of each inserted print/cartridge so that its linear orifice array is aligned: (i) precisely perpendicular to the direction of line traverse, (ii) at a precise distance from a reference surface parallel to the direction of line traverse and (iii) at a generally predetermined spacing from the printing zone. These aspects of the Piatt approach prevents printing artifacts caused by misalignments of the cooperative print/cartridges in the vertical page direction. To prevent artifacts due to misalignments along the horizontal page direction, the Piatt approach utilizes detections of the relative transverse locations of the linear orifice arrays of inserted print/cartridges and coordination of the print/cartridges printing actuations based on such detections. One particularly useful application for this multi-print/cartridge system is to allow printing with a plurality of different color inks, e.g. for pictures, graphics or combinations of such material with text.

Concurrently filed U.S. application Ser. No. 945,133, entitled "High Resolution, Print/Cartridge, Ink Jet Printer", discloses a printer having print/cartridge interface constructions that allow printing of high resolution output with a plurality of lower resolution print/cartridges by physically positioning the orifice arrays of the print/cartridges to print in interlaced cooperation during a traverse of their carriage across a line of the print media. This technique employs a precise physical position of the print/cartridge orifice plate (and thus their orifice arrays) by indexing the orifice plate edges onto carriage referencing surfaces that are precisely offset in the vertical direction, vis-a-vis the horizontal print zone of the printer.

SUMMARY OF THE INVENTION

One significant object of the present invention is to provide improved print/cartridge interface constructions that are adjustable between different print/cartridge indexing conditions to allow interlaced or registered drop placements from inserted print/cartridges. The approach of the present invention enhances the capabilities of its embodying printer, e.g. for attaining registered multicolor printing or interlaced very high resolution printing or increased speed, high resolution, interlaced printing.

Various other advantageous applications can be attained by employing the concepts of this invention, which, in general, constitutes an improvement in ink jet printing apparatus that is adapted for printing along a linear print zone with a plurality of print/cartridges, and includes carriage means for traversing the print zone and receiving and physically indexing a plurality of print/cartridges in a transversely spaced relation with their orifice arrays in precise vertical inter-alignment based on the direction of carriage traverse. In accord with one preferred embodiment of the invention, the physical indexing construction comprises means for selectively varying the indexing of inserted print/cartridges between different vertical alignments.

BRIEF DESCRIPTION OF DRAWINGS

The subsequent description of preferred embodiments refers to the attached drawings wherein.

DETAILED DESCRIPTION OF PREFERRED EMBODIMENTS

Figure 1:
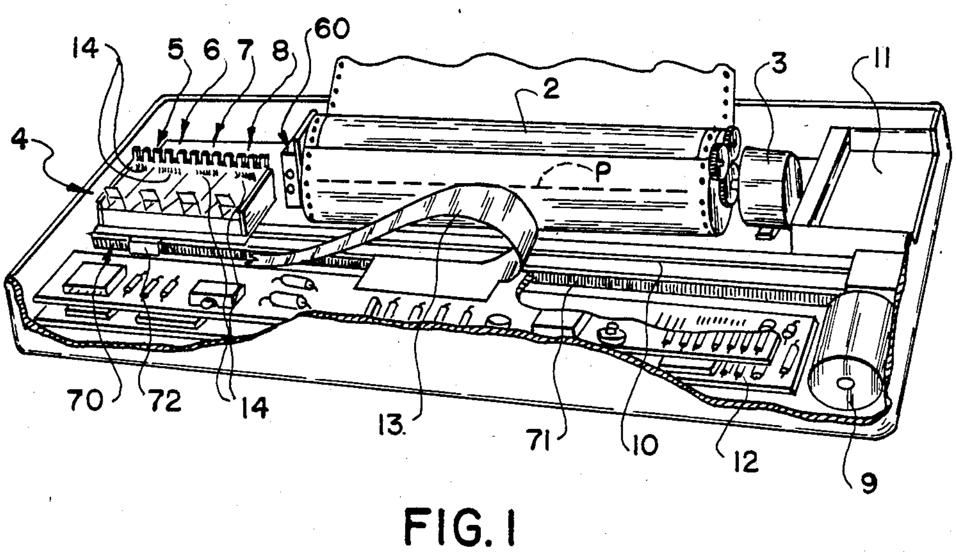
FIG. 1 is a perspective view, with cover portions removed, of one preferred printer embodiment in accord with the present invention.

The ink jet printing apparatus shown in FIG. 1 in general comprises a print medium advancing platen 2 which is adapted to receive sheet or continuous print material, e.g. paper, from an ingress at the lower rear, and under the drive from motor 3, advance successive line portions of the medium past a print zone P, and out of the printer through a printer egress in the top of the printer. During the passage of successive line portions through the print zone, multi print/cartridge carriage 4 is traversed across the print zone so that print/cartridges placed in the four individual carriage nests 5, 6, 7 and 8 can effect printing operations, as subsequently described. The carriage 4 is slidingly mounted on a guide rail means 35 (see FIGS. 4A and 4B) located beneath the print/cartridge support nests 5–8 and a carriage drive motor 9 effects traversing movement of the carriage 4, past the platen face, via an endless cable 10 attached to carriage 4. The printer is electrically energized, e.g. from a battery or transformer located at 11, via a control circuit means 12. Electrical energy is supplied to individual print/cartridges by means of ribbon cables 13 which have terminals 14 in the lower portion of each of support nests 5–8.

Figure 2:
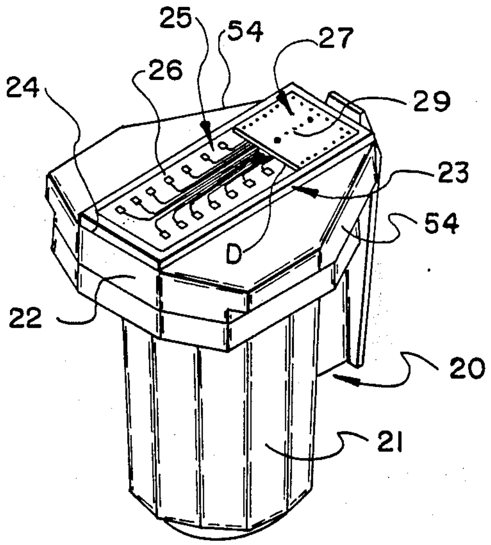
FIG. 2 is a perspective view of one embodiment of disposable print/cartridge which is useful in accord with the present invention.

Referring now to FIG. 2, there is shown one useful print/cartridge embodiment 20, which is adapted to be removably inserted into an operative relation with the printer via carriage 4. The print/cartridge 20 is adapted to be disposable when empty of ink and in general comprises an ink supply reservoir 21 and cover member 22, which covers the ink reservoir and, together with position lugs 51, coarsely positions the print head assembly 23 in nests 5–8. The print head assembly 23 is mounted on the cover member and comprises a driver plate 24 having a plural of electrical leads 25 formed thereon. The leads 25 extend from connector pads 26 to resistive heater elements (not shown) located beneath each orifice 29 of a linear orifice array formed in orifice plate 27. Ink from reservoir 21 is supplied through cover member 22 to a location beneath each orifice 29 of plate 27 (and above the heater element for that orifice). Upon application of an electrical print pulse to a terminal pad by the printer control, the corresponding resistive heater element causes an ink vaporization condition which ejects a printing ink droplet from its corresponding orifice 29. The orifice plate 27 can be electroformed using photofabrication techniques to provide precisely located orifices and is attached to driver plate 23, which is in turn affixed to the cover member 22. Thus it will be appreciated that even though the linear array of orifices 29 is precisely located within the orifice plate 27, its position vis-a-vis the locating portions of cover member 22 is not precisely consistent, e.g. in the vertical or horizontal directions, for different disposable print/cartridges. Print/cartridges of the type just described are known in the art for use in single print/cartridge printers, and, as has been noted, the coarse locating structures are adequate for those applications.

Figure 4A:
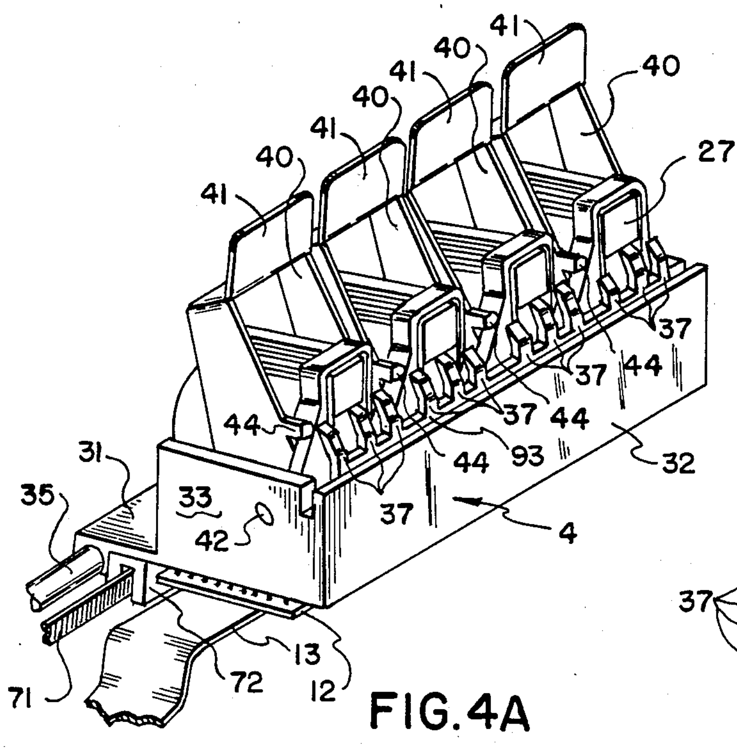
FIGS. 4A and 4B are respectively a perspective and a side view, partially in cross section, of the print/cartridge carriage shown in FIGS. 1 and 3.
Figure 4C:
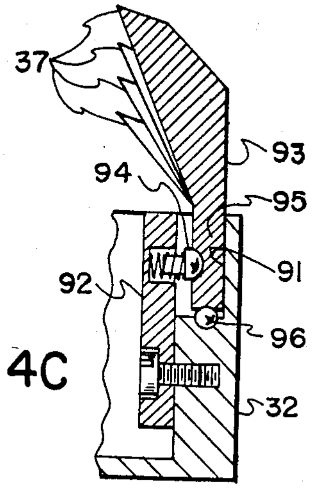
FIG. 4 is a cross-sectional view of a portion of the carriage assembly shown in FIG. 4B.
Figure 4B:
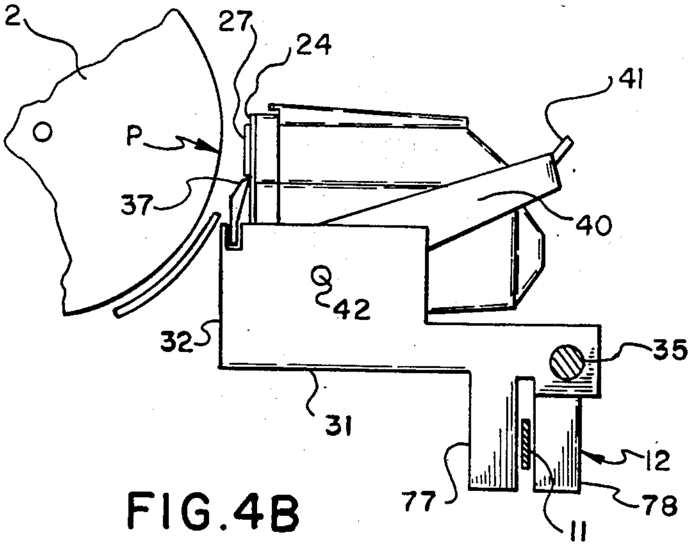

Referring now to FIGS. 4A, 4B and 4C, the print/cartridge carriage 4 comprises a bottom wall portion 31, a front wall portion 32 and side wall portions 33 which together form the plurality of print/cartridge nests 5–8 that are adapted to receive and coarsely position print/cartridges with respect to the printing zone P of the printer. The bottom of wall portion 31 is mounted on guide rail 35 for traversing the carriage across the print zone P in a precisely uniform spacial relation to the platen 2 and in a direction substantially parallel to the axis of that platen's axis of rotation. Thus, the direction of the carriage traverse is substantially orthogonal to the direction of print medium advance.

Figure 5:
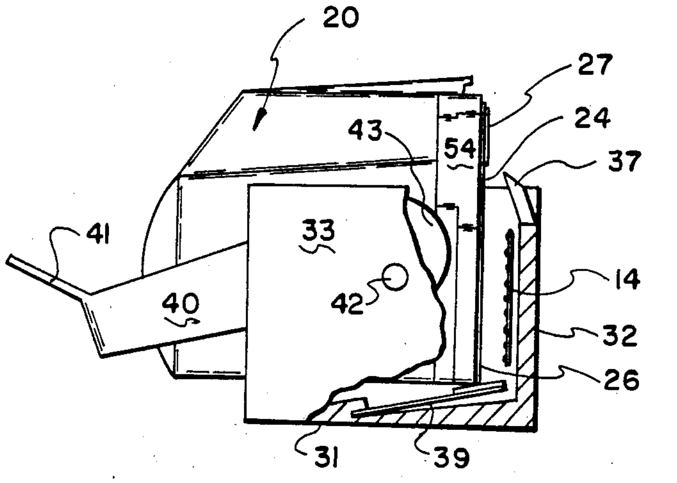
FIGS. 5–8 are views showing various stages of the print/cartridge positioning sequence.
Figure 6:
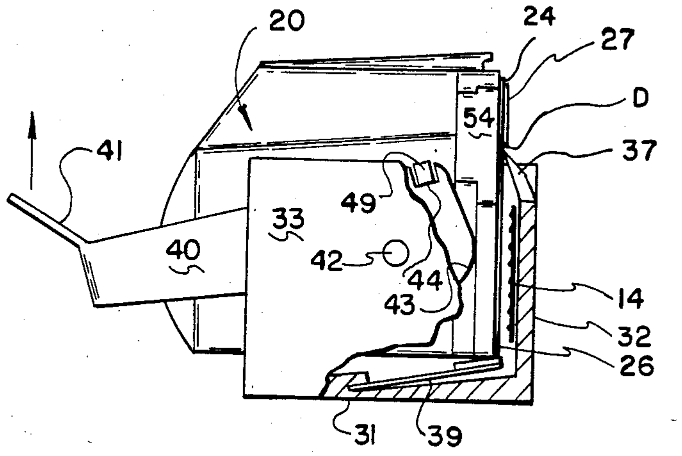
Figure 7A:
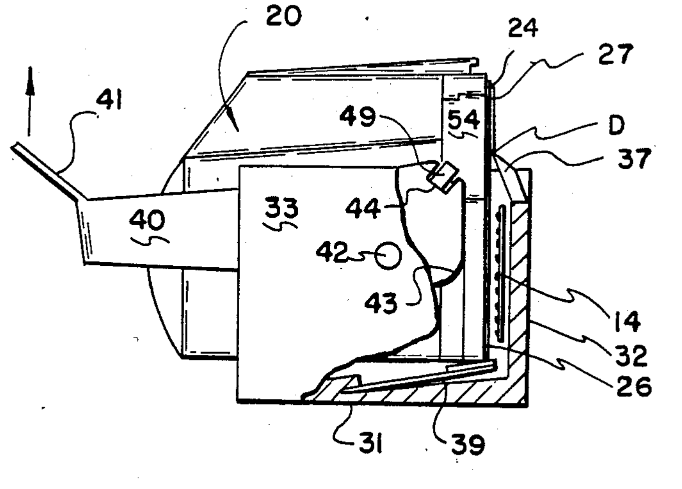
Figure 7B:
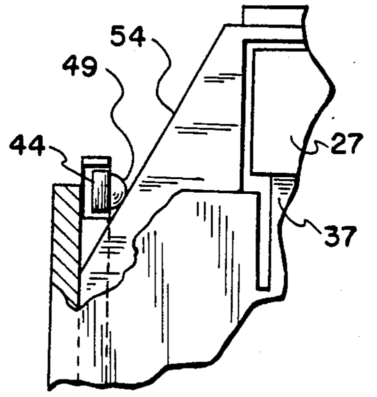

The top of the front wall 32 has as an upper recessed portion 91 which together with an attached interior wall member 92 forms a track in which an adjustable referencing member 93 is mounted for sliding movement in a direction parallel to the direction of carriage translation. A spring-biased pin 94 is mounted in wall 92 to index the sliding movement of member 93 at various positions defined by interfitting recesses 95 formed in the opposing surface of wall 92. Preferably, roller bearings 96 are mounted in recesses of wall 32 and define the bottom of the track on which member 93 slides. If desired the bearings 96 can be vertically adjustable by camming screws (not shown) to facilitate precise definition of the track path. The upper portion of member 93 comprises a plurality of knife portions, which form reference edges that are precisely parallel to the direction of carriage translation and equidistantly spaced from the linear print zone P. Mounted on the side walls of the carriage nests 5–8 are fastening means 40 for contacting print/cartridges, which have been inserted into nests, and moving such print/cartridges into precise operating position in the printer apparatus. Referring to FIG. 5, it can be seen that the fastening means 40 comprises lever arm portions 41, hinge portions 42, camming portions 43 and seating arm portions 44. The bottom wall 31 of each nest 5–8 also comprises a resilient portion 39 and the fastening means is adapted to move the bottom of an inserted print/cartridge into a forced engagement that downwardly compresses resilient portion 39, when the lever arm portion 41 is moved upwardly to the position shown in FIGS. 4A and 4B. When a lever arm portion 41 is moved downward, the fastening means 40 is disengaged and the print/cartridge 20 can be hand-lifted from its nest in the carriage 4.

Referring now to FIG. 2, as well as FIGS. 4–8, each fastening means is designed to provide a predetermined sequence of engagements between the print/cartridge 20 and the carriage 4. First, the print/cartridge is hand-inserted into a coarsely positioned alignment resting loosely in a nest on top of cantilever spring 39 (see FIG. 5). As a fastening means 40 is rotated clockwise (as viewed in FIGS. 5, 6, 7A and 8), the cam portion 43 first urges the smooth top surface of the driver plate 24 into forced contact with opposing knife portions of member 93 (see FIG. 6). At this stage the cam dimples 49 on seating arm portions 44 have not yet contacted the print/cartridge sidewalls. During continued rotation the cam dimples 49 contact shoulder portions 54 of an inserted print/cartridge 20 and move the print/cartridge downwardly against the bias of resilient means 39, while cam portion 43 maintains the forward force urging the driver plate 24 into contact with knife edge 37. During this downward movement, the indexing knife edge beneath the orifice plate will slide along the face of the driver plate 24 until a detent surface D of the print/cartridge engages the knife edge (see FIG. 7A). In the embodiment shown in FIGS. 2–8, the detent D comprises a lower edge portion of the orifice plate 27. As the engagement between the knife edge and the detent edge D evolves, the print/cartridge is oriented within the nest so that the detent edge D is precisely parallel to the related knife edge. Because the orifice array 29 and the detent edge D of the orifice plate 27 are photofabricated, they can be precisely located relative to one another in an economical fashion. Thus precise positioning of the orifice plate's detent edge D relative to a knife edge of a carriage nest precisely locates the printing orifices (rotationally and vertically) relative to the traversing path of the printer carriage 4, as well as in a predetermined spacial relation vis-a-vis the print zone P.

Figure 8:
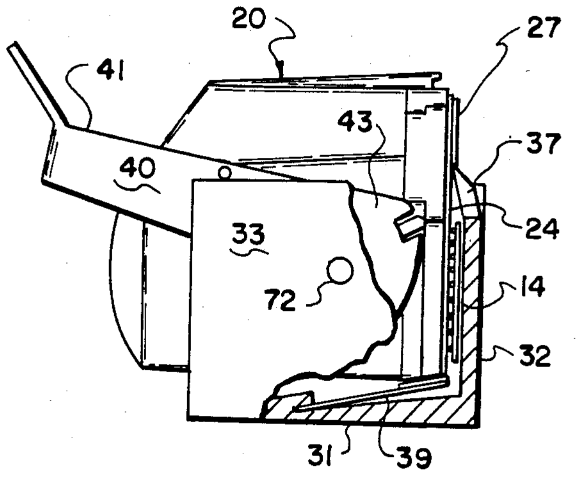

Continued movement of the lever arm 41 causes cam surface 43 to move connector pads 26 of the print/cartridge into contact with the terminals 14 in the nest bottom (see FIG. 8). To allow continued movement of the fasten means 40, after full detenting of the orifice plate, the seating arms 44 are slightly flexible in an outward direction (see FIG. 7B) to allow dimples 49 to slip down the sides of shoulders 54. As shown best in FIG. 7B, the thickness of cantilever seating arm 44 behind dimple 49 is less than the other portions of the fastening means 40 to allow this outward movement.

Figures 3A, 3B, 3C:
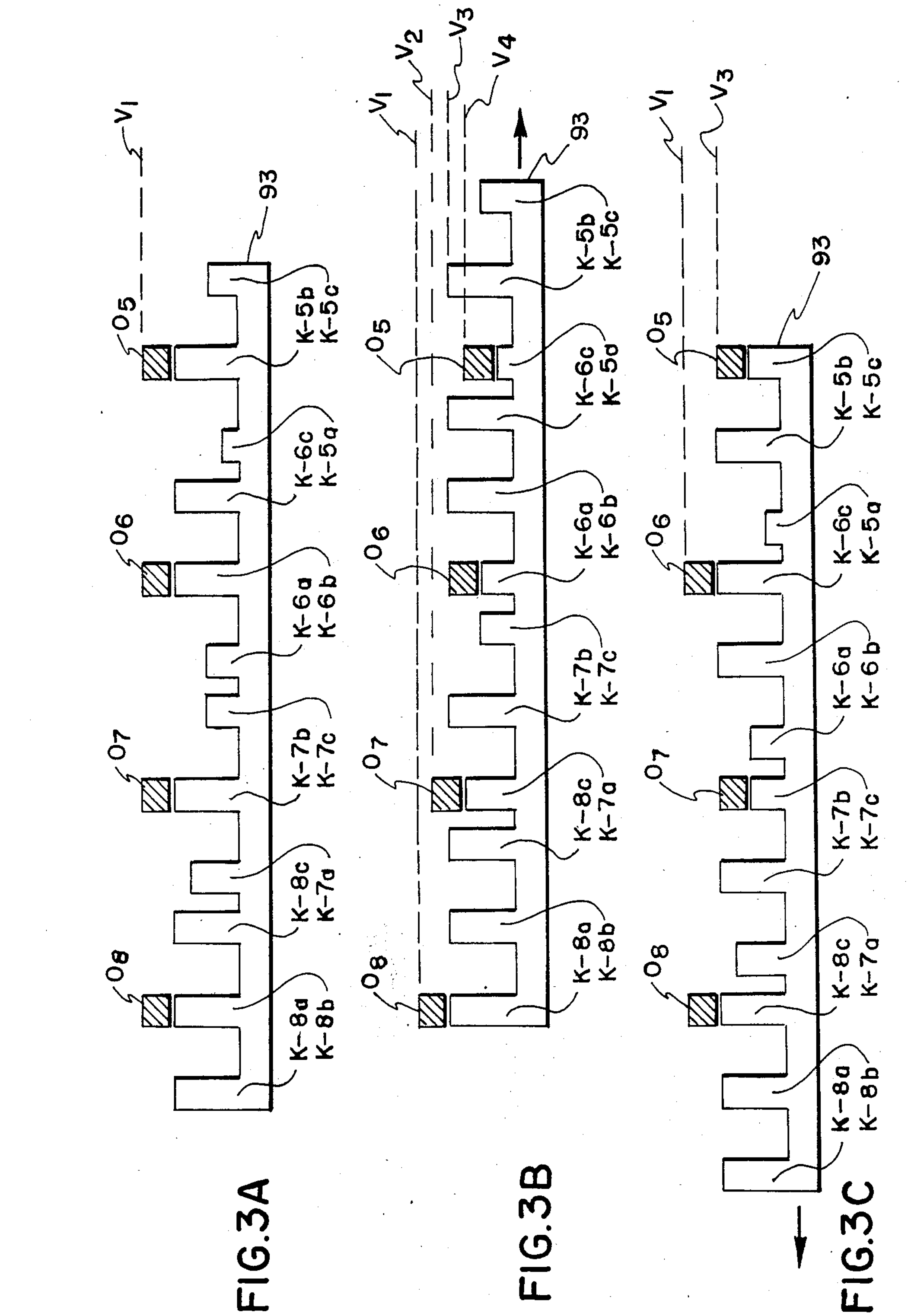
FIGS. 3A–3C are diagrams illustrating, schematically, the adjustable portions of the print/cartridge carriage of the FIG. 1 printer embodiment, as viewed from the print zone side of the apparatus.

Referring now to FIGS. 3A–3C and FIG. 4A, the details of the adjustable referencing member 93 will be described. In FIGS. 3A–3C the orifice plates 27 of four print/cartridges are illustrated schematically by cross-hatched squares $O_5$–$O_8$ (in reference to their related carriage nest) and the referencing member 93 is illustrated schematically as comprising three knife members K for each related carriage nest (i.e. K-5a, K-5b, K-5c, etc). FIG. 3A illustrates the conditions of the knife portions K of members 93 when indexed in the central position as shown in FIG. 4A. Thus, when member 93 has been slidingly indexed in its track to the central position, knife portions K-5b, K-6b, K-7b and K-8b are respectively aligned to index orifices $O_5$–$O_8$ of print/cartridges in their related nests 5–8 as described in detail above. As shown in FIG. 3A, each of the "b" knife portions has the same precise vertical extension so that the orifice plates $O_5$–$O_8$ are all aligned at the same vertical position (e.g. $V_1$). In this condition the orifices of the orifice plates are aligned to provide drop placements "in register", i.e. along corresponding transverse lines of the print zone.

FIG. 3B illustrates the relation of the referencing member 93 and orifice plate 27 when member 93 has been slidingly indexed to its "a" position (i.e. moved rightward as viewed in FIG. 4A). As shown, the "a" portions of member 93 each have a different vertical dimension. Specifically portion K-8a has the same dimension as the "b" portions and K-7a has a dimension that is precisely $\frac{1}{4}$ of the center-to-center spacing (between adjacent orifices in the orifice arrays of the utilized print/cartridges 20) less than K-8a. Similarly, knife portion K-6a has a vertical dimension that is $\frac{1}{2}$ of the orifice spacing less than the K-8a dimension and K-5a has a vertical dimension that is $\frac{3}{4}$ of the orifice spacing less than the K-8a dimension. As shown in FIG. 3B, when the orifices $O_5$–$O_8$ are indexed on the "a" portions of member 93, their orifice arrays will be interlaced, respectively at different heights $V_4$, $V_3$, $V_2$ and $V_1$ to provide very high resolution printing (e.g. 48 pixels per vertical line dimension with 12-orifice print/cartridges).

Referring now to FIG. 3C, it can be seen that when the referencing member 93 is moved to its "c" position, i.e. leftward from the central position as viewed in FIG. 4A, the knife portions K-5c through K-8c are aligned to index received print/cartridges. As shown, portions K-8c and K-6c are of the same vertical dimension as the "b" portions of member 93 and portions K-7c and K-5c are $\frac{1}{2}$ of the orifice center-to-center spacing less than the "b" portions vertical dimension. Thus, in this condition orifice plates $O_8$ and $O_6$ are indexed at the same vertical position $V_1$ and orifice plates $O_7$ and $O_5$ are indexed at the same vertical height $V_3$. By appropriate signal buffering to the inserted print cartridges, this condition of orifice enables pairs of print/cartridges, e.g. $O_8/O_7$ and $O_6/O_5$ to provide interlaced high resolution output (e.g. 24 pixels per vertical line dimension) and for the two pairs to share the output of horizontal line printing so as to allow doubling of the print carriage traverse speed and thus the ultimate output speed of the printer. Stated differently, this condition provides output at a resolution of one-half the FIG. 3B condition but at twice the printing speed.

Various other useful embodiments, in addition to those described with regard to FIGS. 3A to 3C, will occur to those skilled in the art in view of the basic concepts provided by the present invention. Thus, printers can employ the adjustable referencing of other combinations of print/cartridges, e.g. 2 or 3 print/cartridges, and other combinations of ink colors, e.g. for highlighting. A mutual aspect of all such implementations of the invention is the versatility provided by constructing the print/cartridge interface to be adjustable to selectively position the print/cartridges at different relative vertical positions.

The ink jet printer shown in FIG. 1 also includes a sub-system for the control of drop placements, horizontally (i.e. along the direction of carriage traverse), between the cooperative print/cartridges in nests 5–8. Such sub-system in general comprises control means for detecting and storing relative transverse location data for the orifice array of each print/cartridge and means for controlling the print drop actuation of each print/cartridge according to its particular location data. In the FIG. 1 embodiment such detecting means comprises a print/cartridge scan detector device 60 located at a fixed position along the path of carriage traverse and carriage position detector device 70 comprised of a linear encoder strip 71 mounted along the traverse path of the carriage 4 and a strip decoder 72 attached to the carriage for movement in operative relation with the encoder strip 71. In general, the function of the scan detector device 60 is to signal the passage of a unique print/cartridge characteristic that is indicative of the precise transverse location (relative to the scan detector) of that print/cartridge's linear orifice array 29 as the carriage traverses the print/cartridge past the scan detector on its movement toward the print platen 2. In general, the function of the carriage position detector device 70 is to sense and signal successive instantaneous positions of the carriage 4 during its traversing movements.

Figure 10:
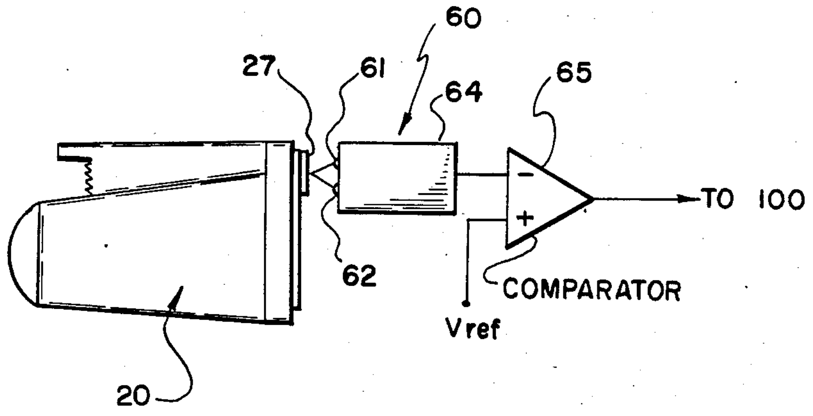
FIG. 10 is a schematic perspective view showing one means for detecting relative-transverse location of print/cartridge orifice arrays in accord with the present invention.

Referring now to FIG. 10, the scan detector device 60 comprises an infrared emitter 61, e.g. an LED, and infrared detector 62, e.g. a phototransistor, both supported in predetermined orientations and spacial relations in sensor block 64. Thus, the emitter 61 is located to direct light obliquely toward the path of a traversing print/cartridge 20 so that when an orifice plate 27 of such cartridge is in the beam of the emitter, its light is reflected by the bright nickel orifice plate metal to return to the detector 62 as shown. Other portions of the print/cartridge are formed of non-reflective material, e.g. black plastic, so that the light energy received by detector 62 during the passage of an orifice plate is significantly greater than when an orifice plate is not in the path of the emitter light beam. In this regard it is noted that the vertical edges of orifice plates, that have been properly indexed via their bottom edge, will be perpendicular to the direction of traverse. The vertical orifice plate edges are linear and have a length such that the scan detector will accurately scan detect the vertical edges of orifice plates even though vertically offset as shown in FIGS. 2 and 3.

As illustrated schematically in FIG. 10, the output of detector 62 is coupled to comparator 65; and when the detector voltage $V_D$ from the detector 62 increases above threshold voltage $V_{ref}$, the shift of comparator 65 to its low state is transmitted to the interface of a microcomputer 100. As will be described in more detail subsequently, the microcomputer interprets such signal from the comparator 65 as the passage event for a leading edge of orifice plate 27. When the print/cartridge orifice plate passes out of the beam from emitter 61, the output of comparator 65 returns to a high state signalling the microcomputer of this trailing edge passage event. One important purpose of carriage position detector 70 is to relate the leading edge/trailing edge events signalled by the scan detector 60 to the positions of the carriage along its traversing path.

Figure 9A:
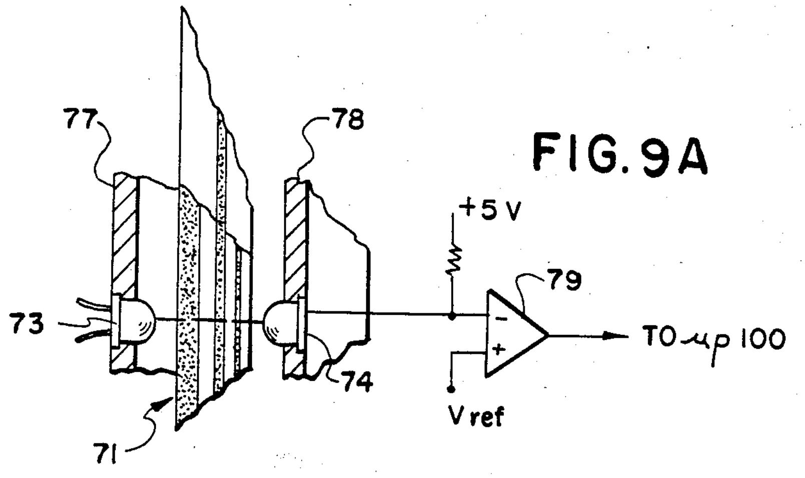
FIGS. 9A and 9B are schematic perspective views illustrating carriage position detection means in accord with one preferred embodiment of the present invention.
Figure 9B:
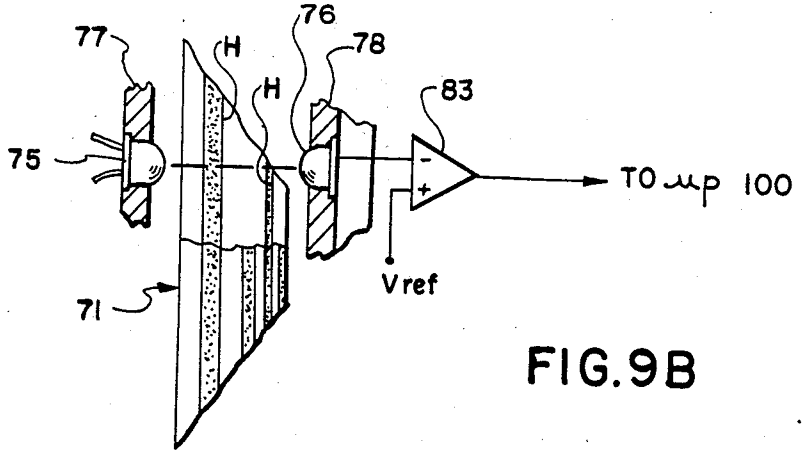

Referring now to FIGS. 9A and 9B, as well as FIG. 1, carriage position detector 70 comprises a strip decoder portion 72 which is mounted for movement with carriage 4 and which includes emitter and detector pairs 73, 74 and 75, 76. The emitters and detectors are disposed in opposing relation respectively on extensions 77, 78 of carriage 4 so as to sandwich the linear encoder strip 71 during the traversing movement of the carriage. As shown in FIG. 9A, the lower portion of the linear encoder 71 comprises a plastic strip of alternating transparent and opaque sections, e.g. each section 2.6 mils wide. Emitter-detector pair 73, 74 is arranged to pass and receive light through this lower strip portion and the power to the emitter 73 is adjusted such that the detector 74 operates in a nonlinear region. Thus, the detector 74 will output a triangular sinusoidal-like voltage waveform in response to modulation by the lower portion of strip 71. The signal from detector 74 is coupled to a comparator 79 which has a threshold voltage level $V_{ref}$ such that the output of comparator 79 changes state at the same stage of every transparent-opaque encoder transition past the detector. As shown in FIG. 9A, the pulse train produced as the output of comparator 79 is applied as separate inputs 84*a* and 84*b* to microprocessor 100 for purposes subsequently described. Emitter-detector pair 75, 76 shown in FIG. 9B is aranged to pass and receive light through the upper part of the encoder strip which has only opaque traverse location markers H. The output of detector 76 is compared by comparator 83 to $V_{ref}$ and the low output from comparator 83 signals the microcomputer 100 that the carriage has reached a certain point(s) along its printing path, e.g. a turn-around location. Further details of useful detector systems are described in U.S. application Ser. No. 945,137, entitled "System for Determining Orifice Interspacings of Cooperative Ink Jet Print/Cartridges", by Piatt, Theodoras and Ray, which is incorporated herein by reference.

Figure 11:
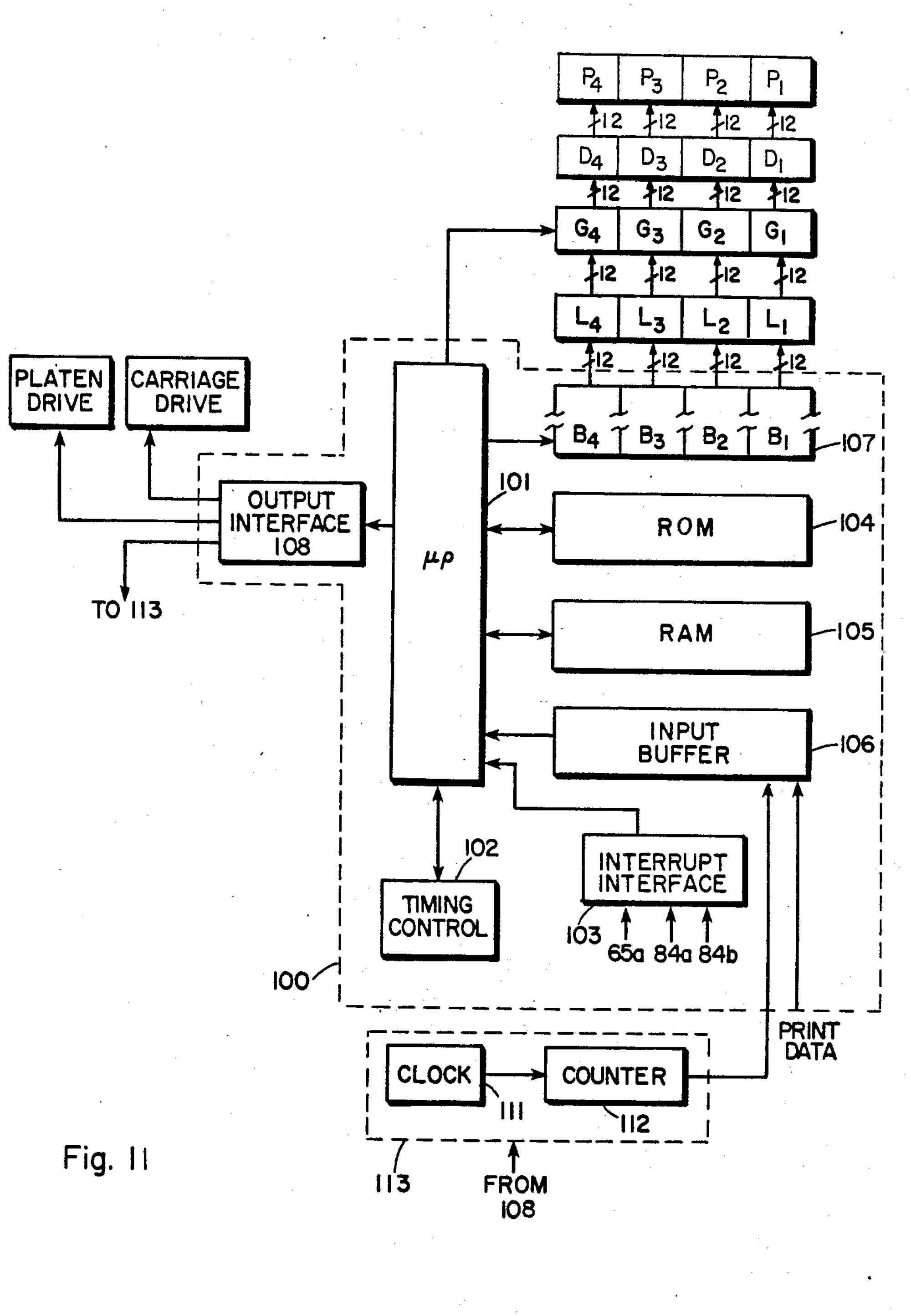
FIG. 11 is a schematic diagram illustrating one control system in accord with the present invention.

Considering the foregoing, there has been described means for detecting the print/cartridge orifice plates' passage of a predeterminedly placed detector and means for detecting various dynamic positions of the carriage 4 along its transversing path. The cooperative functioning of these detecting means as well as the overall operation of the printer can be further understood by referring to FIGS. 11–15. As shown in FIG. 11, microcomputer control system 100 comprises a microprocessor 101 with related timing control and interrupt interface sections 102, 103 and cooperative read only memory (ROM) 104 and read/write memory (RAM) 105. The system 100 also includes input and output buffer interface sections 106, 107 adapted to receive, store and output data for the microprocessor 101. The printer also includes for cooperating with its microcomputer control system 100, an input system 113, including a clock 111 and counter 112, whose function will be described subsequently.

Figure 12:
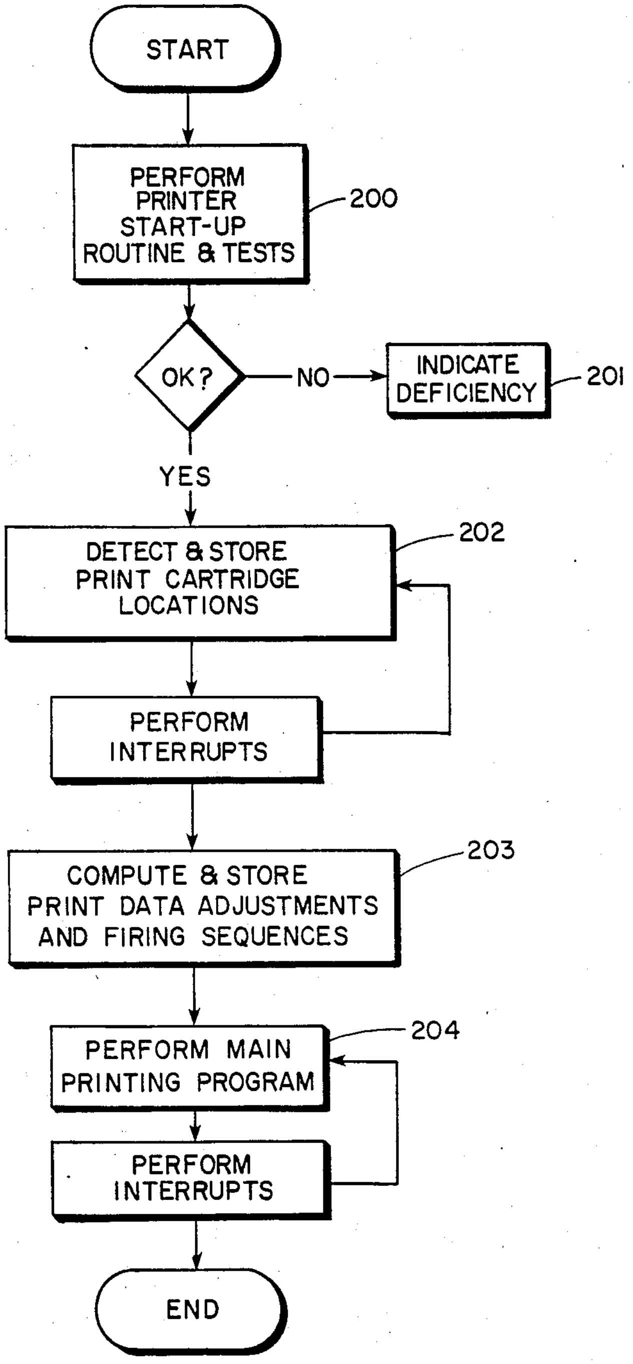
FIGS. 12–15 are flow charts useful in explaining processes performed by the FIG. 11 system.

As indicated by the general flow chart of FIG. 12, the ROM 104 contains programs whereby the microcomputer is, in general, adapted, on start-up, to perform routines such as activating paper drive and carriage drive motors, supplying energy for the print/cartridges, etc., as well as tests for the attainment of proper start-up conditions, e.g. adequate power supply, paper supply, etc. As also shown in FIG. 12, before commencing with the main printing program 204, the control system is programmed, in ROM 104, to detect and store (process 202) the locations of inserted print/cartridges and (process 203) to compute and store (i) data for adjusting the flow of print data from the output buffer 106 and (ii) data for controlling the firing sequences of inserted print/cartridges during the normal printing operations (process 204).

Figure 13:
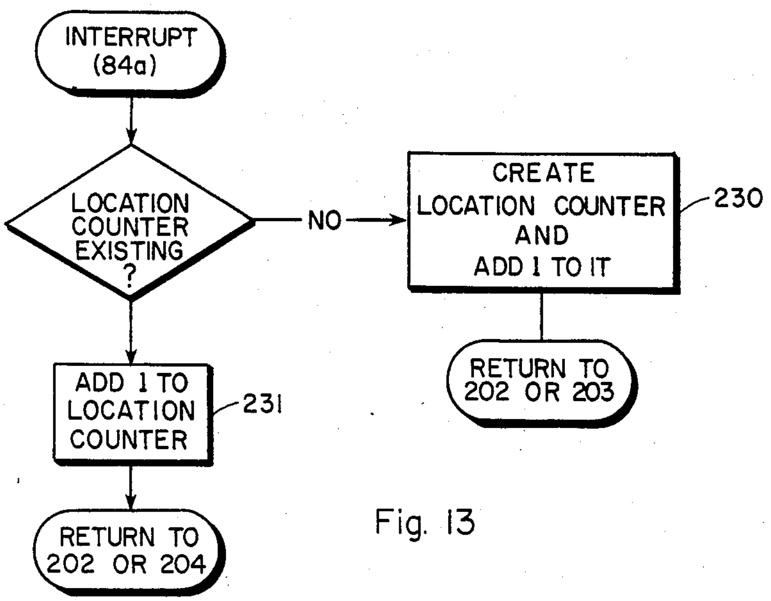

More specifically, after print/cartridges $P_1$–$P_4$ have been inserted and indexed to selected vertical positions as described above and after the start-up test routines (process 200) have been performed, the printer proceeds, under the control of a program in ROM 104, with detect and store function (process 202) as follows. The carriage drive 90 is activated to move a predetermined home station location to the left of the sensor 60 and to then traverse it from left to right past the sensor at a nominal scan speed which is slower than the traversing speed during printing. When the carriage position detector 74 initiates the first pulse from comparator 79 to interrupt port 84*a* of the interrupt interface 103, the procedure shown in FIG. 13 is transferred from ROM 104 to RAM 105. Thus, the interrupt signal will then effect creation of a carriage position counter (process 230) in RAM 105, input a count of "1" to that counter and return the microprocessor to other control functions. When the next pulse from comparator 79 is input at port 84*a*, the carriage position count will be added to by 1 (process 231) and the microprocessor again returned to other work. The sub-routine described with respect to FIG. 13 operates both in the detect and store function (process 202) and the main printing function (process 204).

Figure 14:
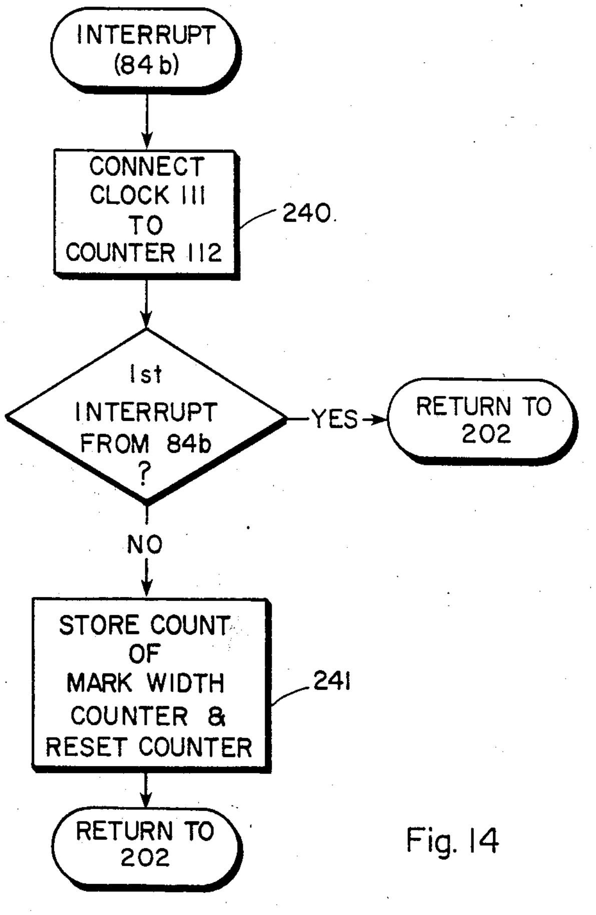

Referring now to FIG. 14, as well as FIG. 11, it can be seen that the pulse train from comparator 79 is also applied to input port 84*b* of interrupt interface 103. This interrupt signal connects clock 111 to counter 112 to begin producing an intra-mark count for the first encoder marking on encoder strip 71. That is, the clock 111 is selected with a frequency that divides each mark (opaque and transparent) of strip 71 into a nominal intra-mark resolution, when the carriage is moving at the nominal scan-detect speed. It should be noted that if the nominal clock speed were selected to yield 300 counts between mark transitions at the nominal carriage scan-detect speed, variations in that speed might yield an intra-mark count of 280 (if above nominal speed) or 320 (if below nominal speed). As shown in FIG. 14, after receipt of the first interrupt signal at port 84*b*, the counter is started and control of the microprocessor is relinquished. However, upon receipt of each subsequent 84*b* interrupt, a mark width count is stored and the counter is reset to "0". Thus, during the traverse of the carriage, the microcomputer has an access to (i) the dynamic intra-mark count of the mark then passing detector 74 and (ii) the entire intra-mark count of the most recently passed mark. Both these data are useful in converting the intra-mark count to intra-mark phase information in the computation process 203 to be described later.

Figure 15:
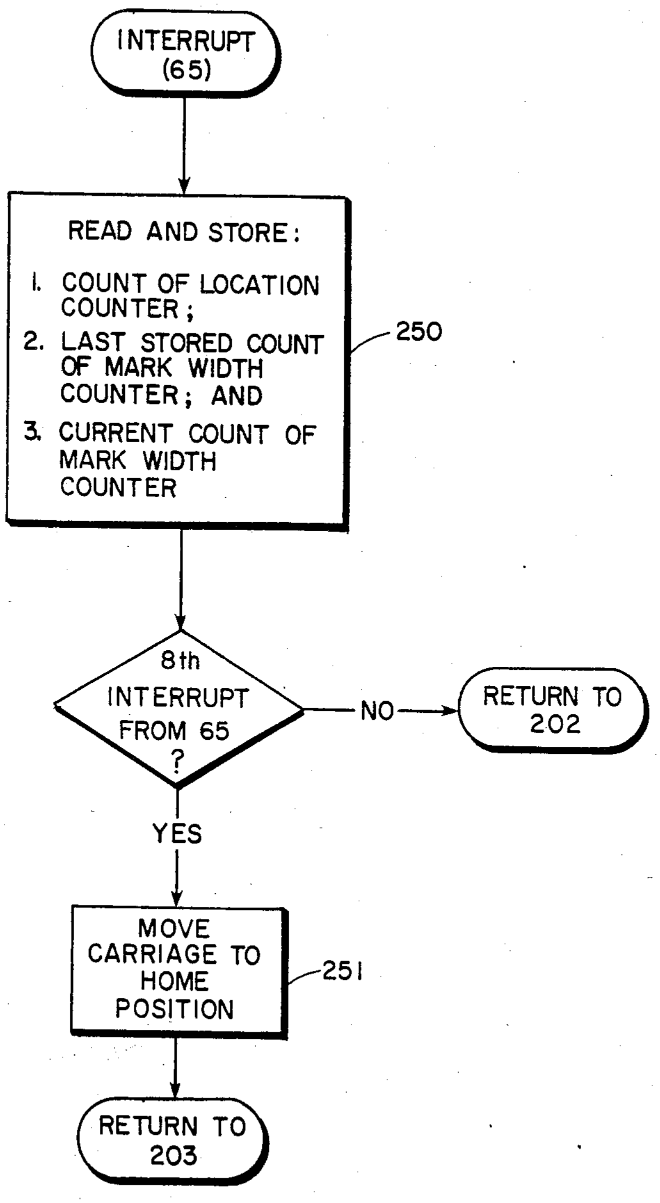

Referring next to FIG. 15, as well as FIG. 11, it can be seen that when a signal from comparator 65 of orifice plate detector 60 is supplied to interrupt port 65a of the microcomputer, a subroutine is addressed in ROM 104 which directs the microprocessor in: (i) reading and storing the mark count then stored in the carriage position counter, created and updated by the FIG. 13 subroutine, (ii) reading and storing intra-mark count of the then most recently passed mark, stored by the FIG. 14 subroutine, and (iii) reading the then existing clock count of intra-mark counter 112 (process 250).

The above-described procedures continue as the print/cartridge moves the leading and trailing vertical edges of each of the print/cartridges orifice plates past sensor 60. After the 8th interrupt procedure of reading and storing, an orifice plate edge data (assuming a four print/cartridge printer), the carriage 4 is returned to the home position (process 251) and computations in accord with process 203 commence. In general, the process 203 is performed by microprocessor 101 under the control of a program in ROM 104, using orifice location data stored in RAM 105 as described above, and has two main objectives, viz. (i) to determine and store the precise transverse distances between the orifice arrays of print/cartridges $P_1$–$P_4$ and (ii) to determine and store the optimum firing sequences for those print/cartridges, as then located. Both of these determinations are useful in coordinating printing with inserted print/cartridges to avoid drop placement artifacts in the transverse page direction.

The distances between the linear orifice arrays can be determined by a number of simple algorithms, based on the fact that the orifice arrays are all precisely located relative to the leading and trailing edges of their orifice plate. Several such procedures are described in concurrently filed U.S. application Ser. No. 945,137, entitled "System for Determining Orifice Interspacings of Cooperative Ink Jet Print/Cartridges" by Piatt, Theodoras and Ray. By using the intra-mark detection features described in U.S. application Ser. No. 945,138, entitled "Transverse Printing Control System for Multiple Print/Cartridge" by Piatt and Ray, which is incorporated herein by reference, additional resolution information is available to even more precisely interrelate the coöperative orifice arrays in printing. One useful algorithm for attaining advantage of the intra-mark data is as follows:

1. Determine each orifice plate edge location as a mark plus phase (fractional mark count) datum by:
   (a) Dividing its current intra-mark count from counter 112 (stored by procedure 250) by the last previous full mark width count (stored by procedure 250); and
   (b) Adding the resultant fraction to the location counter count (stored by procedure 250).

2. Determine the mark count plus phase location datum of the orifice array of each print/cartridge by: (i) comparing count plus phase datum of its edges, (ii) multiplying the remainder of such comparing by a parameter representing the location of the array between the edges and (iii) adding this intra-mark fraction to leading edge location as computed by 1. above. In the following example of this process it is assumed that the array of orifices trails the leading edge of the orifice plate by 0.75 of the orifice plate transverse dimension and calculations are illustrated to identify the orifice array location precisely. However, as will become clear subsequently, in many instances only the precise inter-orifice-plate distances are utilized so that the location of a center of orifice plate symmetry (in the transverse dimension) can be utilized to determine the operative transverse spacing between corresponding portions of adjacent orifice plates rather than dealing with the actual orifice array locations.

EXAMPLE

If the location data of the first print/cartridge edges are:

Leading edge: 902 marks, 230 intra-mark counts, and last previous mark count 311

Trailing edge: 1340, 110 and last previous mark count 291, the leading edge location equals $902+(230+311)=902.74$ and the trailing edge location equals $1340+(110+291)=1340.38$.

If the orifice array is located 0.75 of the orifice plate width from the leading edge, the orifice array location equals $902.74+0.75(1340.38-902.74)=1230.97$.

3. Determine the mark plus phase spacings (S) between each of the print cartridge orifice arrays and the first print/cartridge array, e.g.: $P_4=6127.88$ $P_3=4436.09$ $P_2=2865.74$ $P_1=1230.97$ $S_{1\text{-}4}=4896.91$ $S_{1\text{-}3}=3205.12$ $S_{1\text{-}2}=1634.77$. These spacing data are computed and stored (process 203) and provide information useful for determining print data loading and print head firing sequence adjustments, as well become clear in view of the subsequent explanation of the modes of loading print data into output buffer 107 of the microcomputer.

Figure 16:
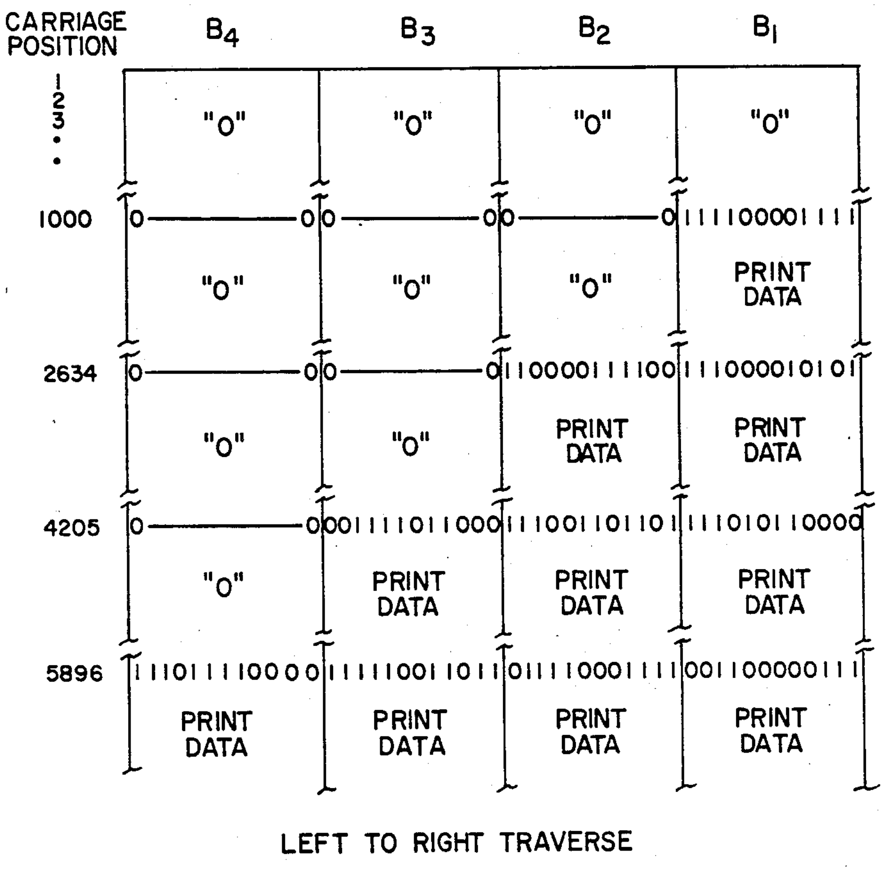
FIGS. 16 and 17 are diagrams useful in explaining the operation of the present invention.

Referring now to FIGS. 11 and 16, one embodiment for effecting transverse drop placement coordination in accord with the present invention will be described. Thus, it can be seen that a buffer output memory 108 contains separate channels $B_1$–$B_4$ respectively for receiving print data for each of the print/cartridges $P_1$–$P_4$. In operation, the print data is received by the input buffer of microcomputer 100 and loaded into the buffers $B_1$–$B_4$ by the microprocessor in particular sequences determined by a program in ROM 104 utilizing the orifice array location data described above, which is stored in RAM 105. More particularly, referring to FIG. 16 (in which "1" indicates a digital signal to eject an ink drop and "0" indicates a non-eject signal), it can be seen that data is loaded into buffer channel $B_1$ so that the first print signals will be ready for output from the buffer at position 1000 of the print head carriage 4. That is, this example assumes that the first possible line print position is 1001 encoder marks to the right of the home station (or start-count mark) and that the buffer is actuated to advance data in its channels one position per encoder mark. Referring again to FIG. 11, it will be seen that upon the 1001 transition pulse, latch $L_1$ is loaded with print/no-print data from buffer $B_1$ while latches $L_2$–$L_4$ are loaded with all 0's from their respective buffer channels. Thus, when the gates $G_1$–$G_4$ are enabled at this print position 1001, the twelve (12) drivers for the 12 orifices of print/cartridge $P_1$ will be fired according to the "0" or "1" information in the latches $L_1$ and appropriate ink drops will be ejected to the print line by $P_1$. As shown in FIG. 16, this condition will continue until position 2634 (i.e. 1000+count spacing $S_{1\text{-}2}$ of 1634) evolves, at which time print/no-print data for print/cartridge $P_2$ will be ready for output to its latches $L_2$.

Reflecting on what has been described, it will be understood that the loading of the buffers $B_1$–$B_4$ will accomplish a delay between the commencement of printing which has been computed and stored (as described previously-process 250) to attain accurately coordinated transverse drop placement between the print/cartridges as physically positioned. Thus, print/cartridge $P_2$ will be provided with printing information 1634 mark transitions after $P_1$, $P_3$ will be provided with printing information 3205 mark transitions after $P_1$, and $P_4$ will be provided with printing information 4897 mark transitions after $P_1$. Each of the buffers will continue to output printing data to its latches until its full line of print data is completed and will thereafter output all "0's". Therefore, as would be expected, print/cartridge $P_1$ will cease printing first, $P_2$ second, $P_3$ third and $P_4$ will cease printing last.

If desired, the twelve drivers for each print/cartridges can be fired sequentially (e.g. 1 to 12 or in pair sequence 1 and 6, 2 and 7, etc.). This is accomplished by the gate control signals supplied by microprocessor under the control of a sequence program in ROM 104. This can be advantageous from the viewpoints of reducing thermal and acoustic crosstalk and of reducing peak power requirements for the drivers' energy source. In addition, the program of ROM 104 desirably provides for the microprocessor's sequential enablement of each gate groups $G_1$–$G_4$, and in this preferred mode of operation, the phase (fractional mark) spacing data that was calculated and stored (process 250) is useful. Thus, consider the spacing data calculated according to the previous example where $S_{1\text{-}4}=4896.91$; $S_{1\text{-}3}=3205.12$ and $S_{1\text{-}2}=1634.77$. In accordance with print head firing sequence algorithm, the gate group for the first print/cartridge ($P_1$ when moving left to right) will be enabled first at each encoder transition. Thereafter, the print/cartridge firing order proceeds from the smallest to greatest fractional mark spacing from $P_1$. Thus, in the example above, gate group $G_3$ for print/cartridge $P_3$ (phase spacing 0.12) should be enabled next after gate group $G_1$; gate group $G_2$ for print/cartridge $P_2$ (phase spacing 0.77) next after group $G_3$ and finally gate group $G_4$ for print/cartridge $P_4$ (phase spacing 0.91) would be enabled.

More specifically, it is preferred in accord with the present invention that the gates $G_3$, $G_2$ and then $G_4$ be enabled at particular intra-mark counts after the enablement of gate $G_1$ that reflects the particular phase spacing of its related print/cartridge from print/cartridge $P_1$. This preferred procedure will accomplish precise drop placements from each of print/cartridges $P_2$–$P_4$ that are precisely coordinated in the transverse dimension. That is, the drops from print/cartridges $P_2$–$P_4$ will be located precisely based on the transverse pixel locations that are defined by the ink drop placements of print/cartridge $P_1$ as it is enabled and fired at each encoder transition signal. For example, considering exemplary the phase spacing information derived above, in a left-to-right printing traverse of carriage 4, the gates $G_3$ would be enabled 0.12 of the nominal 300 intra-mark counts of an encoder signal transition or 36 intra-mark counts after gates $G_1$. Similarly gates $G_2$ will be enabled 231 intra-mark counts after $G_1$ (i.e. $0.77\times300$) and $G_4$ 273 intra-mark counts after $G_1$ (i.e. $0.91\times300$). It will be noted that the above-described embodiment utilizes the nominal intra-mark count of 300 without any adjustment based on the intra-mark count of a next-previous encoder mark. It has been found that at the higher printing-transverse speed of the carriage 4, the mechanical system inertia is such that reliable printing drop placement can be achieved by the servo controls of the carriage drive in combination with the just-described gate enablement technique. Thus referring to FIG. 11, gates $G_1$ will be enabled by microprocessor 101 on the signal from comparator 79, and successively thereafter at counter counts of 36, 231 and 273 gates $G_3$, $G_2$ and $G_4$ will be enabled by microprocessor 101. It should be made clear that, in addition to the sequential enablement of gate groups, the enablement of the 12 gates within each gate group can also be implemented sequentially or in pairs by a program within the microcomputer, so that at any one instant only 1 or 2 of the 48 drivers are energized.

Figure 17:
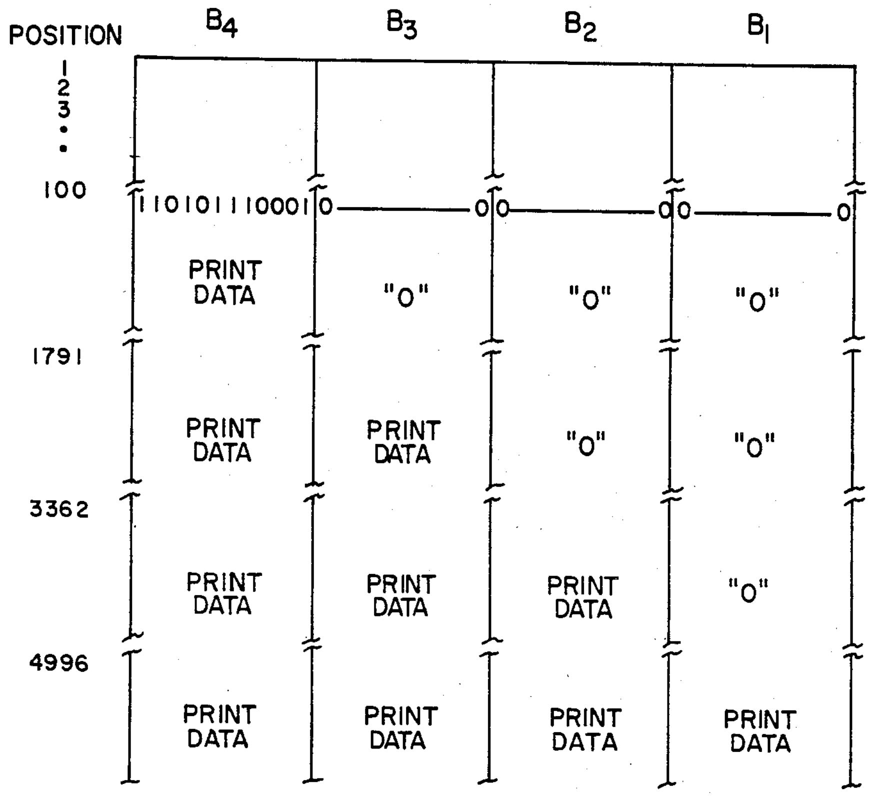

As alluded to previously, the approach of the present invention as described above with respect to a left to right printing traverse can be extended to a return (i.e. right to left) printing traverse. Thus, referring to FIG. 17, it will be seen that print data is loaded into the buffers $B_1$–$B_4$ so that print data for print/cartridge $P_4$ will be ready for output at 101 encoder transitions (in the right to left direction from the right-most carriage stop, e.g. mark H shown in FIG. 9B). Similarly, buffer $B_3$ will be ready to output print data after 1791 mark transitions (right to left), buffer $B_2$ after 3662 such transitions and buffer $B_1$ after 4996 such transitions. In the reverse printing mode the firing sequence algorithm is different from the left to right printing mode, viz: gate group $G_1$ enabled at the mark transition, and other gates enabled in sequential order of smallest to largest complementary phase spacing from $P_1$. That is, the phase spacing for gate enablement is now the phase complement of the above-described left-to-right phase spacing. Thus in the given example the gate group enablement sequence would be $G_1$, $G_4$ (complementary phase spacing $1.00-0.91=0.09$)), $G_2$ (complementary phase spacing 0.23) and $G_3$ (complementary phase spacing 0.88). Hence, $G_1$ would be enabled on the encoder mark, $G_4$ enabled 27 intra-mark counts after $G_1$, $G_2$ enabled 69 intra-mark counts after $G_1$ and $G_3$ enabled 264 intra-mark counts after $G_1$.

The invention has been described in detail with particular reference to preferred embodiments thereof, but it will be understood that variations and modifications can be effected within the spirit and scope of the invention.

We claim:

1. In ink jet printing apparatus having means for feeding successive line portions of a print medium past a linear print zone, an adjustable printing system comprising:

(a) a plurality of substantially identical print/cartridges each having an ink reservoir, an array of drop ejection elements and an orifice plate including: (i) an array of orifices located in a precisely interspaced relation and (ii) a detent means precisely located with respect to said orifice array;

(b) carriage means for insertably supporting said print/cartridges and for traversing them along said print zone in a direction substantially perpendicular to the direction of print medium feed; and (c) a plurality of adjustable index means, coupled to said carriage means, for respectively positioning the detent means of inserted print/cartridges selectively at one of a plurality of predetermined vertical locations relative to the direction of carriage means traverse, whereby the printing droplets from the orifice arrays of inserted and indexed print/cartridges can be selectively; (i) vertically interlaced or (ii) in register during a printing traverse of said carriage.

2. The invention defined in claim 1 wherein the orifices of each print/cartridge are located in a linear array with an identical center-to-center spacing and wherein said index means are adjustable between a colinear condition and a vertically offset condition.

3. The invention defined in claim 1 wherein said detent means comprises linear edge portions of said orifice plates and said index means comprises linear knife edge portions adapted to abut said linear orifice plate edges.

4. The invention defined in claim 3 wherein said linear orifice arrays are perpendicular to said detent edges and said knife edges are precisely parallel to the direction of carriage means traverse.

5. The invention defined in claim 4 wherein said indexing means includes means for fastening said print-/cartridges with their detent means in engagement with respective knife edge portions.

6. The invention defined in claim 1 wherein said indexing means comprises at least one pair of knife edges vertically offset in the direction of the line of positioned orifice arrays and selectively alignable with the detent edge of an inserted print/cartridge.

7. In ink jet printing apparatus having means for feeding successive line portions of a print medium past a linear print zone, and adapted for use with a plurality of substantially identical print/cartridges each having an ink reservoir, an array of drop ejection elements and an orifice plate including: (i) an array of orifices located in a precisely interspaced relation and (ii) a detent means precisely located with respect to said orifice array, the improvement comprising:

(a) carriage means for insertably supporting said print/cartridges and for traversing them along said print zone in a direction substantially perpendicular to the direction of print medium feed; and
(b) a plurality of adjustable index means, coupled to said carriage means, for respectively positioning the detent means of inserted print/cartridges selectively at one of a plurality of predetermined vertical locations relative to the direction of carriage means traverse, whereby the printing droplets from the orifice arrays of inserted and indexed print/cartridges can be selectively: (i) vertically interlaced or (ii) in register during a printing traverse of said carriage.

8. The invention defined in claim 7 wherein the orifices of each print/cartridge are located in a linear array with an identical center-to-center spacing and wherein said index means are adjustable between a colinear condition and a vertically offset condition.

9. The invention defined in claim 8 wherein said detent means comprises linear edge portions of said orifice plates and said index means comprises linear knife edge portions adapted to abut said linear orifice plate edges.

10. The invention defined in claim 9 wherein said linear orifice arrays are perpendicular to said detent edges and said knife edges are precisely parallel to the direction of carriage means traverse.

11. The invention defined in claim 10 wherein said indexing means includes means for fastening said print-/cartridges with their detent means in engagement with respective knife edge portions.

12. The invention defined in claim 7 wherein said indexing means comprises at least one pair of knife edges vertically offset in the direction of the line of positioned orifice arrays and selectively alignable with the detent edge of an inserted print/cartridge.

13. In ink jet printing apparatus of the type having feed means for advancing successive line portions of a print medium past a linear print zone, a system for printing with a plurality of removable print/cartridges comprising:

(a) a plurality of print/cartridge carriages constructed to traverse said print zone in a common direction and removably support such print/cartridges;
(b) a plurality of referencing surfaces respectively on each of said carriages, said surfaces being parallel to the direction of said carriages' traverse and vertically adjustable relative to said print zone; and
(c) fastening means for moving supported print/cartridges into a precise detent relation with respective referencing surfaces of said carriages.

14. In ink jet printing apparatus of the kind which includes means for advancing a print medium along a feed path so that successive line portions move sequentially past a linear print zone and which is adapted for use with a print/cartridge of the type including an ink reservoir, drop generator elements, electrical leads to such elements and an orifice plate having a linear array of orifices aligned with respective drop generator elements, a print/cartridge interface system for selectively positioning a plurality of such print/cartridges for cooperative printing in at least two different modes and said system comprising:

(a) carriage means, including a plurality of integral print/cartridge support means, mounted for movement in a traversing direction adjacent said linear print zone;
(b) a plurality of adjustable referencing surface means, each mounted for movement on said carriage means between different alignments with a respective print/cartridge support means, said referencing surfaces being precisely parallel to the direction of carriage means traverse; and
(c) indexing means for urging received print/cartridges into a condition wherein a detent portion of its orifice plate is indexed to the referencing surface on its support means.

15. In ink jet printing apparatus of the kind which includes means for advancing a print medium along a feed path so that successive line portions move sequentially past a linear print zone and which is adapted for use with a plurality of substantially identical print/cartridges of the type including an ink reservoir, drop generator elements, electrical leads to such elements and an orifice plate having a linear array of orifices aligned with respective drop generator elements, a print/cartridge interface construction for selective positioning of a plurality of such print/cartridges, comprising:

(a) a plurality of support means, each mounted for movement in a traversing direction adjacent said linear print zone, for receiving such print/cartridges;
(b) a plurality of referencing surfaces, each constructed for traversing movement with a respective print/cartridge suport means, said referencing surfaces being precisely parallel to the direction of support means traverse and synchronously adjustable between a colinear condition and a vertically offset condition;

(c) a plurality of terminal means each constructed for traversing movement with a respective print/cartridge support means; and (d) indexing means for urging received print/cartridges into a condition wherein a detent portion of its orifice plate is indexed to the referencing surface on its receiving support means and its electrical leads are operatively coupled to respective terminal means.

16. The invention defined in claim 1 further comprising means for detecting and storing the relative transverse locations of indexed orifice arrays and means for controlling the printing actuations of each indexed print head in accordance with its detected transverse location, whereby the drop placements of such indexed print heads are accurately interrelated transversely within the line commonly printed thereby.

* * * * *